United States Patent
Kyodo

[11] Patent Number: 5,886,453
[45] Date of Patent: *Mar. 23, 1999

[54] METHOD AND APPARATUS FOR CONTROL OF A SUPERSONIC MOTOR

[75] Inventor: Yasumasa Kyodo, Tokyo, Japan

[73] Assignee: Sony Corporation, Japan

[*] Notice: This patent issued on a continued prosecution application filed under 37 CFR 1.53(d), and is subject to the twenty year patent term provisions of 35 U.S.C. 154(a)(2).

[21] Appl. No.: 676,243
[22] PCT Filed: Nov. 17, 1995
[86] PCT No.: PCT/JP95/02361
  § 371 Date: Jul. 17, 1996
  § 102(e) Date: Jul. 17, 1996
[87] PCT Pub. No.: WO96/16470
  PCT Pub. Date: May 30, 1996

[30] Foreign Application Priority Data

Nov. 18, 1994  [JP]  Japan ................................. 6-285659

[51] Int. Cl.$^6$ ............................................. H02N 2/00
[52] U.S. Cl. ........................................................ 310/316
[58] Field of Search ................................... 310/316, 317

[56] References Cited

U.S. PATENT DOCUMENTS

| | | | |
|---|---|---|---|
| 4,749,896 | 6/1988 | Suzuki et al. | 310/316 |
| 4,833,358 | 5/1989 | Suzuki | 310/316 |
| 4,926,084 | 5/1990 | Furutsu et al. | 310/316 |
| 4,965,532 | 10/1990 | Sakurai | 310/316 |
| 5,113,116 | 5/1992 | Wilson | 310/316 |
| 5,153,486 | 10/1992 | Hirotomi | 310/316 |
| 5,173,631 | 12/1992 | Suganuma | 310/316 |
| 5,192,889 | 3/1993 | Myhoga | 310/316 |
| 5,216,338 | 6/1993 | Wilson | 310/316 |
| 5,373,212 | 12/1994 | Beau | 310/316 |
| 5,376,855 | 12/1994 | Suganuma | 310/316 |
| 5,457,362 | 10/1995 | Bitzer et al. | 310/316 |
| 5,477,099 | 12/1995 | Suganuma | 310/316 |
| 5,479,063 | 12/1995 | Suganuma | 310/316 |
| 5,539,268 | 7/1996 | Kataoka | 310/316 |
| 5,578,888 | 11/1996 | Safabakhsh | 310/328 |

FOREIGN PATENT DOCUMENTS

| | | | |
|---|---|---|---|
| 1-214276 | 8/1989 | Japan | H02N 2/00 |
| 1-283073 | 11/1989 | Japan | H02N 2/00 |
| 1-298967 | 12/1989 | Japan | H02N 2/00 |
| 6-269180 | 9/1994 | Japan | H02N 2/00 |

*Primary Examiner*—Thomas M. Dougherty
*Attorney, Agent, or Firm*—Ronald P. Kananen; Rader, Fishman & Grauer

[57] ABSTRACT

A method for control for a supersonic motor able to control torque independently and an apparatus for the same. In the invention, the mechanical inductance ($L_0$) and mechanical capacitance ($C_0$) are set so as to cancel each other out by series resonance so as to enable operation of the supersonic motor at the mechanical resonance point of its vibrator, (b) a parallel resonance tank circuit (23) is configured using the inductance ($L_d$) component provided at the outside of the supersonic motor so as to be cancelled out by an electrostatic capacitance ($C_d$) and use is made of a circuit comprised of a mechanical arm resistance of the supersonic motor and a torque-mirror circuit, and (c) a reference voltage corresponding to the reference torque is supplied to the piezoelectric actuators (13, 14) of the supersonic motor to control the torque of the supersonic motor. The voltage supplied to the piezoelectric actuators (13, 14) driving the vibrator (11) is proportional to the torque. By adding a speed control loop to the outside of the torque-mirror circuit, it is also possible to control the speed of the supersonic motor. Further, by adding a position control loop to the outside of the speed control loop, it is also possible to control the position of the supersonic motor.

15 Claims, 7 Drawing Sheets

WAVE PROPAGATION DIRECTION $$(a)\ f_0 = \frac{1}{2\pi\sqrt{L_oC_o}} \quad j\omega L_o = \frac{1}{j\omega C_o}$$

$$(b)\ f' = \frac{1}{2\pi\sqrt{L_dC_d}} \quad j\omega L_d = \frac{1}{j\omega C_d}$$

METHOD AND APPARATUS FOR CONTROL OF A SUPERSONIC MOTOR

TECHNICAL FIELD

The present invention relates to a method and apparatus for the control of a supersonic motor, more particularly relates to a method and apparatus for the control of a supersonic motor which enables independent control of the torque.

BACKGROUND ART

It has been about 10 years since supersonic motors were first reported.

A supersonic motor has superior high torque characteristics. Practical use of supersonic motors is possible in various fields using these characteristics.

Up until now, however, no method has been established for accurately controlling the torque produced in the supersonic motor. That is, up until now, no one has proposed a method for independent control of the torque in a supersonic motor. As a result, supersonic motors have not been commercially used in applications for control of position and speed like those of electromagnetic type servo motors, for example, for as part of a robot arm for increasing or decreasing the speed of movement. That is, the supersonic motors up until now have not, unlike electromagnetic type servo motors, allowed the formation of current loops and therefore have not been able to be directly connected to and operated in cooperation with the general commercially available robot controllers.

Details will be provided below.

A supersonic motor is usually driven near the mechanical resonance point so as to reduce loss, but right from when supersonic motors were first reported, attempts have been made to control supersonic motors by changing the sensitivity of the motors by deliberately shifting the mechanical resonance point. This technique, however, is equivalent to controlling the supersonic motor by changing the impedance of the motor, so inherently destroys the linearity of the control system of the motor. Accordingly, stable control of a supersonic motor cannot be achieved.

At the initial stage after the first reports of supersonic motors, several proposals were made on speed control for the motors. All of these methods control the speed by detecting the output voltage of an amplitude sensor built in part of the supersonic motor or the absolute value of the amplitude or phase difference of the current flowing to piezoelectric actuators and immediately changing the resonance frequency. These methods of control, however, do not independently control the torque, so are not suited to applications involving formation of a servo loop as with electromagnetic motors.

A recently proposed improved method of control of a supersonic motor involves referring the rotational speed of the rotor against data stored as a table in a memory of a controller to calculate in reverse the torque produced and then changing the reference speed value. This method does in the end control the drive voltage or the resonance frequency, but requires detection of the rotational speed of the rotor or involves indirect parameters derived from the computation using the data stored as a table in the memory, is susceptible to noise, and cannot really be said to directly control the torque, so is still wanting in terms of formation of a servo loop.

In this way, the methods of control of supersonic motors proposed and commercialized up until now have not be well suited to cooperative operation of a supersonic motor built in as part of a commercially available robot controller.

DISCLOSURE OF THE INVENTION

The object of the present invention is to provide a method and apparatus for control of a supersonic motor able to easily and stably control a supersonic motor.

A more specific object of the present invention is to provide a method and apparatus for control of a supersonic motor forming a servo loop.

The inventors analyzed equivalent circuits of supersonic motors and as a result discovered that if certain conditions were satisfied, the torque of a supersonic motor could be expressed as a voltage.

That is, they discovered that (a) by setting the mechanical inductance ($L_0$) and mechanical capacitance ($C_0$) so as to cancel each other out by series resonance so as to enable operation of the supersonic motor at the mechanical resonance point of its vibrator and (b) by further configuring a parallel resonance tank circuit using an external inductance ($L_d$) so as to cancel out an electrostatic capacitance ($C_d$), (c) the voltage supplied becomes proportional to the torque.

Specifically, the load of the supersonic motor is always varied, but, in the torque control circuit of the present invention, the circuit configurations of the control circuit for the supersonic motor and the inner equivalent circuit of the supersonic motor are perfectly symmetric, and thus, at the both sides of the load, a voltage substantially equal to the reference voltage can be applied. Namely, the relationship between the circuit configuration of the control circuit of the supersonic motor and the circuit configuration of the inner equivalent circuit of the supersonic motor corresponds to the well known "voltage mirror circuit", and in the present invention, the voltage is equivalent to the torques, in this description, the circuit of the present invention is called as "torque mirror circuit" or "torque symmetric circuit." The present invention has the advantage that the supersonic motor can be controlled in response to the torque.

The present invention is based on this discovery.

The method for control for a supersonic motor of the present invention comprises controlling to zero a phase difference of a voltage supplied to piezoelectric actuators of the supersonic motor and a current flowing to the vibrator so as to match a mechanical resonance point of a vibrator of the supersonic motor.

Alternatively, the method of control for a supersonic motor of the present invention comprises detecting an amplitude of a vibrator of the supersonic motor and controlling to zero the phase difference between a voltage showing the detected amplitude of the vibrator and a voltage supplied to piezoelectric actuators of the supersonic motor.

Preferably, the voltage supplied to the piezoelectric actuators driving the supersonic motor is controlled in accordance with a drive torque of the supersonic motor.

In the above, first, the mechanical inductance ($L_0$) and the mechanical capacitance ($C_0$) are set so as to cancel each other out under series resonance conditions. This is normal practice to operate a supersonic motor under minimum loss conditions. Next, a parallel resonance tank circuit is configured using an external inductance ($L_d$) provided at the outside of the supersonic motor so as to cancel out the electrostatic capacitance ($C_d$). By this, the supersonic motor ends up with just a mechanical arm resistance component and it is enough to control the state of connection of a load to the resistance, so the control becomes extremely simple. At this time, the supplied voltage is proportional to the torque, so by controlling the supplied voltage supplied to the piezoelectric actuators, it is possible to control the torque of the supersonic motor.

Alternatively, the method of control for a supersonic motor of the present invention comprises matching a mechanical resonance point of a vibrator of the supersonic motor, providing a tank circuit having an inductance component in a resonant relationship with an electrostatic capacitance of the vibrator, and controlling a voltage supplied to piezoelectric actuators of the supersonic motor in accordance with a drive torque of the supersonic motor.

Alternatively, the method of control for a supersonic motor of the present invention comprises matching a mechanical resonance point of a vibrator of the supersonic motor, providing a tank circuit having an inductance component in a resonant relationship with an electrostatic capacitance of the vibrator, using a circuit comprised of a mechanical arm resistance of the supersonic motor and a torque-mirror circuit and applying a reference voltage corresponding to a reference torque to piezoelectric actuators of the supersonic motor, and controlling the torque of the supersonic motor.

Further, the method of control for a supersonic motor of the present invention may have a speed control loop added at the outside of the torque mirror circuit for speed control of the supersonic motor.

Further, the method of control for a supersonic motor of the present invention may have a position control loop added at the outside of the speed control loop added at the outside of the torque mirror circuit for position control of the supersonic motor.

Note that instead of the method of (a) controlling to zero the phase difference of the voltage supplied to the piezoelectric actuators of the supersonic motor and the current flowing to the vibrator so as to match the mechanical resonance point of the vibrator of the supersonic motor, it is also possible to (b) provide an amplitude sensor for detecting the amplitude of the vibrator of the supersonic motor and control to zero the phase difference between the output voltage of the amplitude sensor and the voltage supplied to the piezoelectric actuator.

According to the above methods of control, it becomes possible to form a servo loop with the supersonic motor in the same way as with an electromagnetic motor.

Alternatively, according to the invention, there is provided an apparatus for control of a supersonic motor comprised of a vibrator, a rotor arranged at one surface of the vibrator, and at least two piezoelectric actuators provided a predetermined phase apart at the other surface of the vibrator, wherein a tank circuit having an inductance component having a resonant relationship with an electrostatic capacitance of the supersonic motor is connected to the supersonic motor, and the apparatus for control of a supersonic motor is provided with a circuit comprising a mechanical arm resistance of the supersonic motor and a torque-mirror circuit, a torque-voltage converting means for converting a reference torque to a corresponding reference voltage, and a means for supplying the converted voltage from the torque-voltage converting means to the two piezoelectric actuators.

Preferably, the torque-mirror circuit is comprised of a circuit for multiplying the mechanical arm resistance and a mechanical arm current of the supersonic motor.

Preferably, the supersonic motor is provided, before or after the torque-voltage converting means, with an adding means for adding an offset to the reference voltage.

Further, according to the invention, there is provided an apparatus for speed control of a supersonic motor comprised of a vibrator, a rotor arranged at one surface of the vibrator, and at least two piezoelectric actuators provided a predetermined phase apart at the other surface of the vibrator, wherein a tank circuit having an inductance component having a resonant relationship with an electrostatic capacitance of the supersonic motor is connected to the supersonic motor, and the apparatus for control of a supersonic motor is provided with a circuit comprising a mechanical arm resistance of the supersonic motor and a torque-mirror circuit, a torque-voltage converting means for converting a reference torque to a corresponding reference voltage, a means for supplying the converted voltage from the torque-voltage converting means to the two piezoelectric actuators, a means for detecting a speed signal of the supersonic motor, a speed error calculating means for calculating an error between a reference speed signal and the detected speed signal, and a speed-torque converting means for converting the speed error to the reference torque.

Alternatively, according to the invention, there is provided an apparatus for position control of a supersonic motor supersonic motor comprised of a vibrator, a rotor arranged at one surface of the vibrator, and at least two piezoelectric actuators provided a predetermined phase apart at the other surface of the vibrator, wherein a tank circuit having an inductance component having a resonant relationship with an electrostatic capacitance of the supersonic motor is connected to the supersonic motor, and the apparatus for control of a supersonic motor is provided with a circuit comprising a mechanical arm resistance of the supersonic motor and a torque-mirror circuit, a torque-voltage converting means for converting a reference torque to a corresponding reference voltage, a means for supplying the converted voltage from the torque-voltage converting means to the two piezoelectric actuators, a means for detecting a speed signal of the supersonic motor, a speed error calculating means for calculating an error between a reference speed signal and the detected speed signal, a speed-torque converting means for converting the speed error to the reference torque, a means for detecting a position of the rotor of the supersonic motor, a position error calculating means for calculating an error between the detected position signal and a reference position signal, and a position-speed converting means for converting the calculated position error signal to the reference speed signal and supplying it to the speed error signal calculating means.

Alternatively, according to the invention, there is provided an apparatus for control of a supersonic motor comprised of a vibrator, a rotor arranged at one surface of the vibrator, and at least two piezoelectric actuators provided a predetermined phase apart at the other surface of the vibrator, provided with a means for matching a mechanical resonance point of the vibrator, a tank circuit having an inductance component having a resonant relationship with an electrostatic capacitance of the vibrator, and a means for controlling the voltage supplied to piezoelectric actuators of the supersonic motor in accordance with a drive torque of the supersonic motor.

Alternatively according to the invention, there is provided an apparatus for control of a supersonic motor comprised of a vibrator, a rotor arranged at one surface of the vibrator, and at least two piezoelectric actuators provided a predetermined phase apart at the other surface of the vibrator, provided with a means for matching a mechanical resonance point of the vibrator, a tank circuit having an inductance component having a resonant relationship with an electrostatic capacitance of the vibrator, and a means for using a circuit comprised of a mechanical arm resistance of the supersonic motor and a torque-mirror circuit and supplying a reference voltage corresponding to the reference torque to the piezoelectric actuators of the supersonic motor.

BRIEF DESCRIPTION OF THE DRAWINGS

FIG. 1 gives views of a supersonic motor for explaining the basic principle of the motor to which the present invention is applied, wherein

BEST MODE FOR WORKING THE INVENTION

First Embodiment

Basic Principle of Supersonic Motor

Figure 1A:
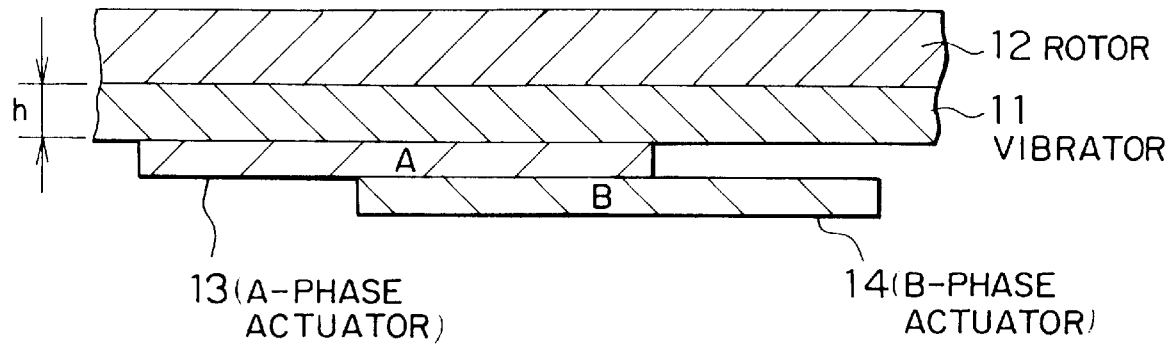
FIG. 1(A) is a cross-sectional view of a supersonic motor 10.
Figure 1B:
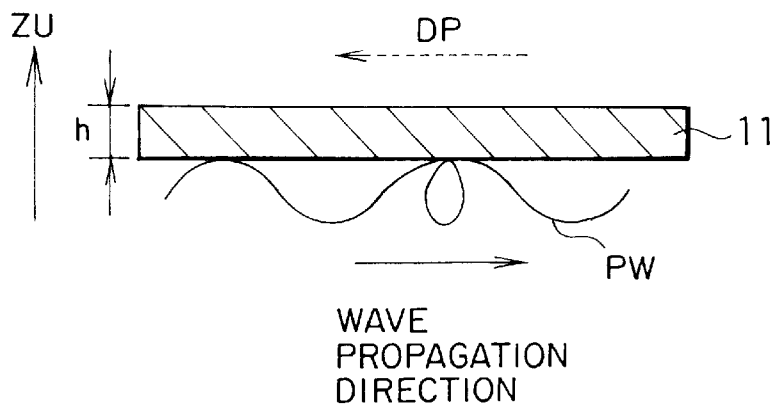
FIG. 1(B) is a view for explaining the principle of its basic operation.
Figure 1C:
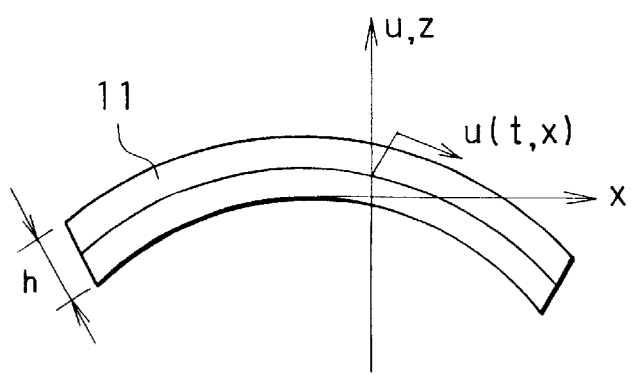
FIG. 1(C) is a view for explaining the basic operation.

FIG. 1(A) is a schematic cross-sectional view of a supersonic motor to which the present invention is applied. FIGS. 1(B) and (C) are views for explaining the basic operation of the supersonic motor shown in FIG. 1(A).

The supersonic motor 10 shown in FIG. 1(A) includes a vibrator 11, a rotor 12 arranged at and rotating in press-contact with a surface of the vibrator 11, and two piezoelectric actuators arranged at the opposite surface of the vibrator 11 and supplying vibration to the vibrator 11, that is, the A-phase piezoelectric actuator 13 and the B-phase piezoelectric actuator 14.

The A-phase piezoelectric actuator 13 and the B-phase piezoelectric actuator 14 are adhered to the surface of the vibrator 11 shifted 1/2 a pitch apart. These two piezoelectric actuators 13 and 14 drive the supersonic motor. The A-phase piezoelectric actuator 13 and the B-phase piezoelectric actuator 14 are conjugate with each other, that is, equivalent. A sine wave voltage and a cosine wave voltage are supplied to these piezoelectric actuators. Note that the progressive wave resulting from this drive system is called a "pseudo progressive wave".

This supersonic motor 10 operates based on the following principle.

If voltages shifted exactly π/2 in phase, that is, sine wave and cosine wave voltages, are supplied to the A-phase piezoelectric actuator 13 and the B-phase piezoelectric actuator 14 adhered to the surface of the vibrator 11 shifted 1/2 a pitch, two standing waves are produced shifted in phase by exactly π/2 at the adhesion position of the A-phase piezoelectric actuator 13 and the adhesion position of the B-phase piezoelectric actuator 14. When these two standing waves are combined, the progressive wave PW expressed by the following is produced:

$$A \sin(\omega t - kx)$$

Due to this progressive wave PW, the vibrator 11 undergoes repeated elliptical motion as expressed by the later mentioned equation 4. As a result, the rotor 12 rotates toward the direction DP. That is, the rotor 12 rotates about the vibrator 11. Due to this, the supersonic motor 10 functions as a motor.

An actual supersonic motor has a rotor which is modified in various ways to smooth the frictional drive so the mechanical equivalent circuit becomes complicated.

Seen from the perspective of control, the conditions for stable drive differ for each supersonic motor due to the difference in shape of the motor, but here an ideal supersonic motor is assumed for simplification of the discussion.

The supersonic motor 10 shown in FIG. 1(A) is assumed to meet the following conditions of an ideal supersonic motor:

(1) There is no overall slip between the vibrator 11 and the rotor 12.

That is, there is a proportional relationship between the amplitude of the vibrator 11 and the speed of the rotor 12.

(2) The voltage for starting the rotation under no-load conditions is substantially constant and not that large.

That is, if the efficiency of the supersonic motor 10 becomes poor, the vibrator 11 will not rotate regardless of the vibration.

If an equivalent circuit is used for this ideal supersonic motor, then even if there are various shapes of supersonic motors, there is the advantage that it becomes possible to apply the model based on this equivalent circuit for most supersonic motors and, further, to apply it to piezoelectric actuators other than supersonic motors.

The present invention in principle can be applied to a linear supersonic motor, a complex vibrator, or a progressive wave type supersonic motor, but the following description will be made referring to a progressive wave type supersonic motor as a typical example.

FIG. 1(B) is a conceptual view of the supersonic motor 10 shown in FIG. 1(A), that is, the well known progressive wave type supersonic motor.

If voltages shifted exactly π/2 in phase are applied to the A-phase piezoelectric actuator 13 and the B-phase piezoelectric actuator 14 in this way and a progressive wave vibration expressed by $A \sin(\omega t - kw)$ is given to the plate-beam-like vibrator 11, elliptical vibration is caused by the progressive wave PW at the surface of the plate-beam-like vibrator 11 (the elliptical motion is shown by the later mentioned equation 4), a drive power DP is produced in a direction opposite to the propagation direction of the progressive wave, and the rotor 12 is made to move in a certain direction with respect to the vibrator 11. The rotor 12 is moved at the portion corresponding to the peak of the vibration produced at the vibrator 11.

The displacement u(t,x) in the flexing direction of the plate-beam-like vibrator 11 is shown by the following equation 1:

$$u(t,x) = A \cos(\omega t + kx) \tag{1}$$

where, u(t,x): Position in the x-direction at the time t

A: Force factor

ω: Angular velocity (ω=2 πf)

k: Constant

Breaking down equation 1 and expressing it by two phases, the following equation 2 is obtained:

$$A \cos(\omega t+kx) = A \cos \omega t \cdot \cos kx - A \sin \omega t \cdot \sin kx = A \cos \omega t \cdot \sin(\pi/2 - kx) - A \sin \omega t \cdot \sin kx \quad (2)$$

Equation 2 means that when sine/cosine wave vibrations of different phases are added at 90° intervals at locations shifted spatially by 90° (1/2 pitch), the result is a progressive wave.

The first term of equation 2 is the A-phase component due to the A-phase piezoelectric actuator 13, while the second term is the B-phase component due to the B-phase piezoelectric actuator 14.

The velocity component ($\alpha u_x/\alpha t$) of the points of the x-axis, that is, the propagation direction, is expressed by equation 3.

$$\frac{\alpha ux}{\alpha t} = ux = \frac{khA}{2} \omega \cdot \cos(\omega t + kx) \quad (3)$$

Note that the elliptical motion is given by the following equation 4:

$$\frac{ux}{\left(\frac{khA}{2}\right)^2} + \frac{u_z}{A^2} = 1 \quad (4)$$

The A-phase piezoelectric actuator 13 and B-phase piezoelectric actuator 14 have the ability to change electrical energy into mechanical displacement. This is shown by the piezoelectric equations 5 and 6. These piezoelectric equations are the basic equations when configuring an equivalent circuit as seen from the standpoint of a piezoelectric material.

$$F = Zv - AV \quad (5)$$

$$I = Av + Yd \cdot V \quad (6)$$

where, F: Force (vector)

v: Velocity (vector)

Z: Mechanical impedance proportional to the velocity

A: Force factor (force-electrical conversion ability of piezoelectric actuator)

V: Voltage applied to piezoelectric actuators

I: Current flowing to the piezoelectric actuators

Yd: Admittance as a capacitor (electrostatic capacitance= Cd), where Yd=j$\omega$Cd From equations 5 and 6, it will be understood that the force F corresponds to the voltage V supplied to the piezoelectric actuators 13 and 14, while the velocity v corresponds to the current I flowing to the piezoelectric actuators.

Figure 2:
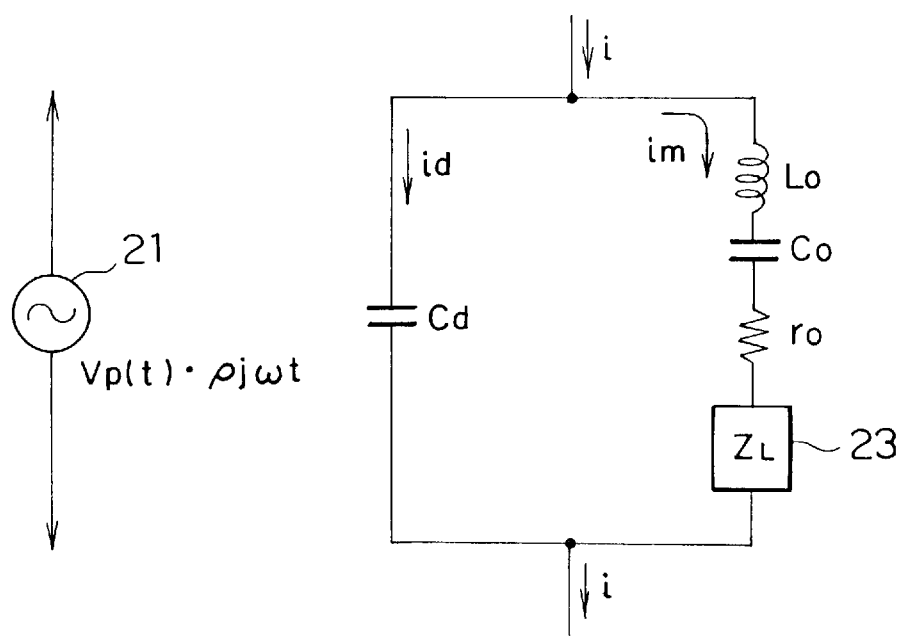
FIG. 2 is a view of an equivalent circuit of the supersonic motor shown in FIGS. 1.

FIG. 2 shows an equivalent circuit. The meaning of the symbols in FIG. 2 are as follows:

$C_d$: Electrostatic capacitance as capacitor $i_d$: Electrostatic capacitance current $i_m$: Mechanical arm current (corresponding to velocity v)

$L_0$: Mechanical inductance (mass m)

$C_0$: Mechanical capacitance (constant 1/k)

$r_0$: Mechanical arm resistance at no-load (frictional resistance at no-load proportional to velocity=R)

$V_P$: Voltage of battery or power outlet (corresponding to force or torque)

$Z_L$: Load resistance connected to vibrator or rotor A load resistance $Z_L$ equal to 0 means no-load operation. The current $I_m$ flowing to the load resistance $Z_L$ means the mechanical or vibrator velocity v and has a vibration component of the angular frequency $\omega$). The angular frequency $\omega$ is typically from 10 to 180 kHz.

In the case of a progressive wave type supersonic motor, part of this cycle is used to take out just the force in a certain direction, so the e(j$\omega$t) component included in the supplied voltage does not appear and only the voltage $V_P$(t) of the amplitude function acts on the load resistance $Z_L$. The A-phase and the B-phase are conjugate, so the same waveform appears at each phase.

Note that the equivalent circuit shown in FIG. 2 has a reverse relationship of the current (torque) and voltage (velocity) of an equivalent circuit of a DC servo motor.

Here, an explanation will be made of the progressive wave and the driving of the A-phase piezoelectric actuator and the B-phase piezoelectric actuator.

Figure 3:
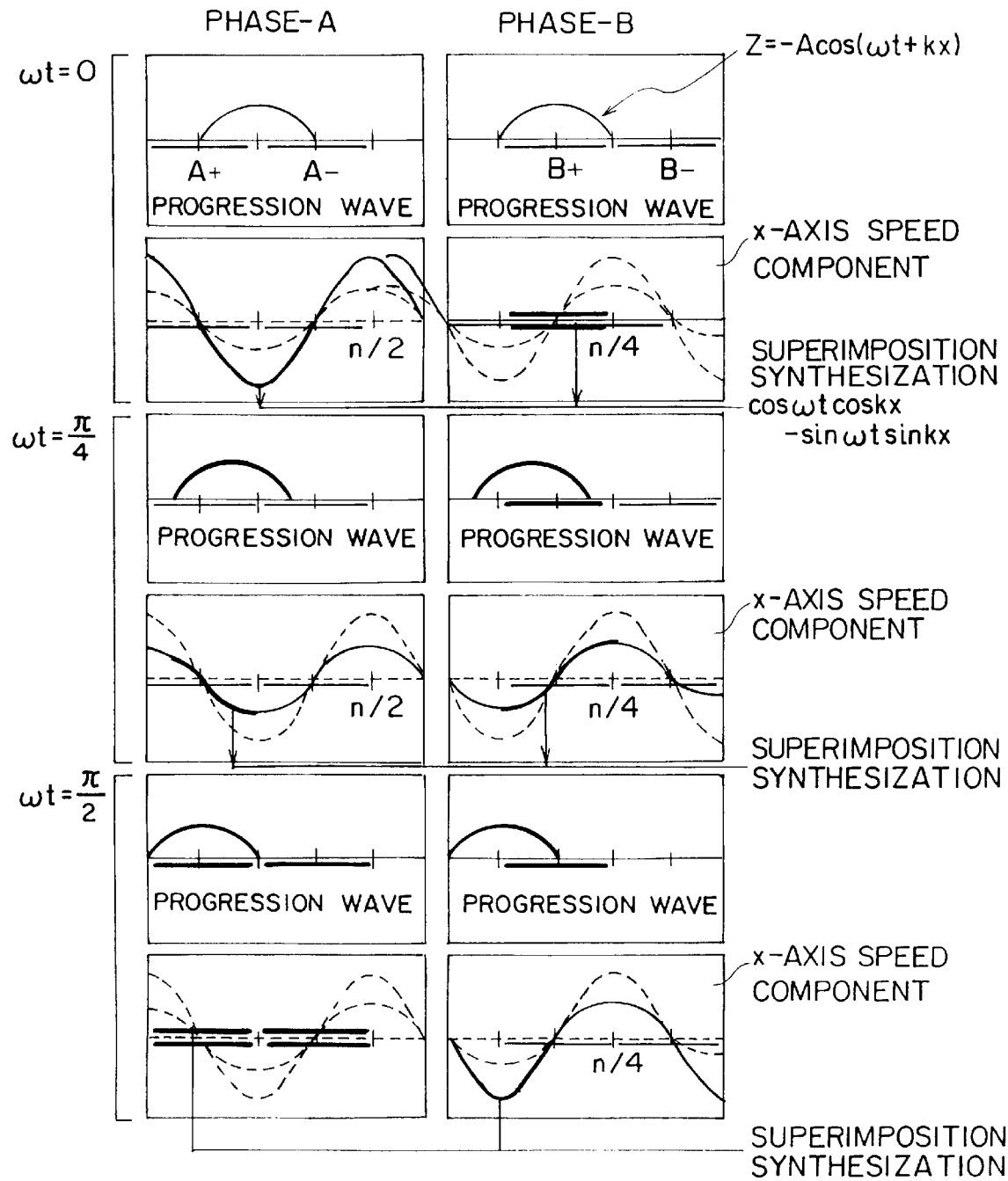
FIG. 3 is a view illustrating the principle of two-phase drive of the supersonic motor.

FIG. 3 illustrates the relationship between the movement of the progressive wave and the velocity component in the x-direction (direction of propagation) of the vibration surfaces of the A-phase and B-phase piezoelectric actuators along with the elapse of time. The vibrator (rotor) is in contact at the portion shown by the bold line in the figure.

As shown in the following Table 1, the voltage and current are the same in phase at the phase state in the equivalent circuit shown in FIG. 2, that is, the force produced and the velocity at the surfaces of the A-phase piezoelectric actuator 13 and B-phase piezoelectric actuator 14 are the same in phase.

TABLE 1

|  | A-phase | B-phase |
|---|---|---|
| Voltage | cos$\omega$t | sin$\omega$t |
| Current | cos$\omega$t | sin$\omega$t |
| Z velocity | Cos$\omega$t | sin$\omega$t |
| x velocity | cos$^2\omega$t | sin$^2\omega$t |
| Torque | cos$^2\omega$t | sin$^2\omega$t |
| Power | cos$^2\omega$t | sin$^2\omega$t |

When a viscoelastic body is used for the rotor frictional member 12, elastic frictional forces proportional to the surface velocities of the A-phase piezoelectric actuator 13 and B-phase piezoelectric actuator 14 are produced. These forces are combined and the rate of decrease of the velocity is determined. From this and the integral of the velocity in the x-direction calculated from FIG. 3, the drive voltages, currents, surface velocities, and torque distribution ratios of the piezoelectric actuators 13 and 14 at the different phases are found as shown in Table 1. From this, it is understood that the A-phase and B-phase are completely equivalent and when combined give a constant torque and velocity.

Some ideas for further simplifying the equivalent circuit shown in FIG. 2 will be explained with reference to FIGS. 4(A) to 4(C).

Figures 4A, 4B, 4C:
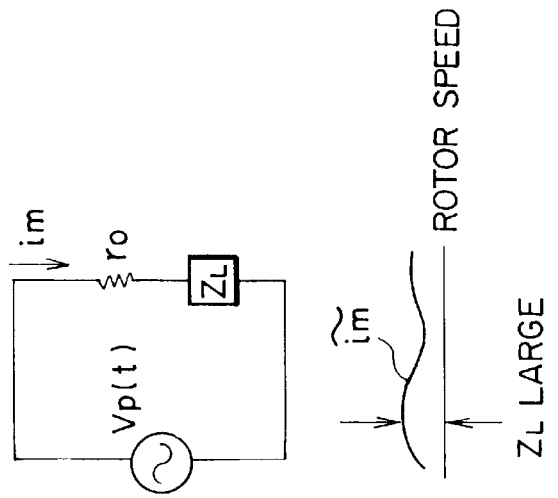
FIGS. 4(A) to 4(C) are views illustrating a simplified version of the equivalent circuit shown in FIG. 2.

FIG. 4(A) shows the parallel connection to the supersonic motor 10 of a power source 21 for supplying voltage shifted in phase by exactly $\pi/2$ to the A-phase piezoelectric actuator 13 and B-phase piezoelectric actuator 14 of the supersonic motor 10 and an electrostatic capacitance $C_D$ serving as the capacitor. FIG. 4(B) is an equivalent circuit of the same. FIG. 4(C) is a simplified version of the equivalent circuit shown in FIG. 4(B).

If $f_0$ is the mechanical resonance frequency of the vibrator 11, then the following equations stand under series resonance conditions:

$$2\pi f_0 = \omega_0 \quad (7)$$

$$\omega_0 = \frac{1}{\sqrt{L_0 C_0}} \quad (8)$$

The mechanical inductance $L_0$ and mechanical capacitance $C_0$ in FIG. 2 cancel each other out under series resonance conditions since their impedances are equal and so it may be considered that there are no mechanical inductance $L_0$ and mechanical capacitance $C_0$.

Further, the electrostatic capacitance $C_d$ is the pure electrostatic capacitance component, so by configuring the external inductance $L_d$ and the tank circuit (parallel resonance circuit) 23 (FIG. 4B) to give the following equation, the impedances of $C_d$ and $L_d$ become equal and are cancelled out so therefore it may be considered that there is no electrostatic capacitance $C_d$.

$$\omega' = \frac{1}{\sqrt{C_d L_d}} \quad (9)$$

As explained above, (a) by setting the mechanical inductance $L_0$ and mechanical capacitance $C_0$ so as to cancel each other out under series resonance conditions so as to enable operation at the mechanical resonance point of the vibrator 11 and (b) by further configuring a tank circuit 23 using an external inductance $L_d$ so as to cancel out an electrostatic capacitance $C_d$, the equivalent circuit of the vibrator 11 in the end becomes the simple configuration shown by the mechanical arm resistance $r_0$ and the load resistance $Z_L$ of the load 24 as shown in FIG. 4(C).

Figure 5:
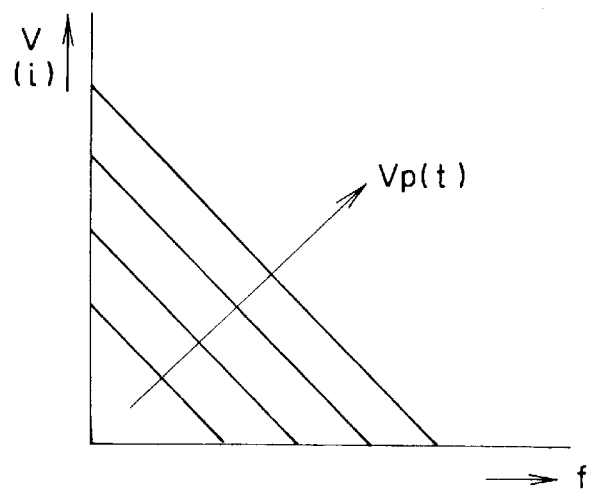
FIG. 5 is a graph of the static characteristic of a supersonic motor in the equivalent circuit of FIG. 4(C)

The rotor 12 has a demodulation function, so the circuit shown in FIG. 4(C), as illustrated in FIG. 5, can be used as is as the equation for the static characteristic of the supersonic motor 10. That is, the simplified equivalent circuit shows that the voltage $V_P(t)$ from the power source 21 is proportional to the torque. It is learned that at the above two resonance states, it is possible to control the voltage $V_P(t)$ of the power source 21 so as to control the torque of the supersonic motor 10.

The current $i_m$ flowing to the A-phase piezoelectric actuator 13 and B-phase piezoelectric actuator 14 can be measured (detected), so a voltage $V_0 = V_r + V_i$ comprised of the supersonic motor internal voltage $V_i = i_m \times r_0$, which is a value obtained by detecting the current $i_m$ in advance from the admittance circle and multiplying it with the mechanical arm resistance $r_0$, plus the reference voltage $V_r$ is supplied to the two ends of the A-phase piezoelectric actuator 13 and B-phase piezoelectric actuator 14.

Figure 6:
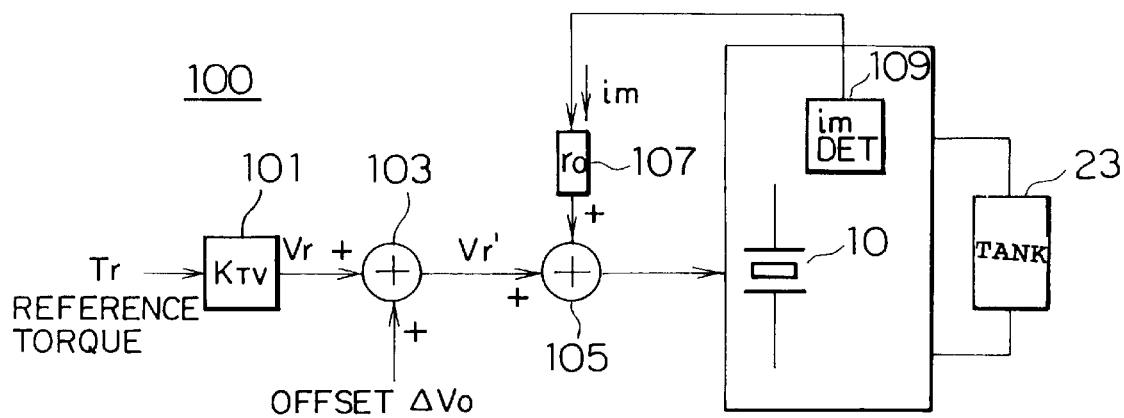
FIG. 6 is a view of a basic equivalent circuit for the driving the supersonic motor.

The circuit configuration realizing this is shown in FIG. 6.

This supersonic motor control circuit 100 includes a multiplier (circuit) 101 for multiplying the coefficient $K_{TV}$ with the torque command to convert it to a reference voltage $V_r$ according to the torque command $T_R$, an adder (circuit) 103 for adding to the reference voltage a no-load stopping voltage $\Delta V_0$ as an offset to produce a modified reference voltage $V_r'$, an adder (circuit) 105 for adding to the modified reference voltage $V_r'$ a supersonic motor internal voltage $V_i = i_m \times r_0$, a current detection circuit 109 for detecting the current flowing to the A-phase piezoelectric actuator 13 and B-phase piezoelectric actuator 14 of the supersonic motor 10, and a multiplier (circuit) 107 for multiplying the mechanical arm resistance $r_0$ with the current $i_m$ detected by the current detection circuit 109 to calculate the supersonic motor internal voltage $V_i = i_m \times r_0$.

The supersonic motor 10 has connected to it a tank circuit 23.

In this example, the voltage $V_0$ supplied to the A-phase piezoelectric actuator 13 and B-phase piezoelectric actuator 14 of the supersonic motor 10 is expressed by the following:

$$V_0 = V_r' + V_i = V_r + \Delta V_0 + V_i = (T_R \times K_{TV}) + \Delta V_0 + V_i$$

Note that the voltage $\Delta V_0$ for correcting the stopping voltage under engine no-load conditions (no-load stopping voltage correction voltage) supplied as the offset voltage is an option and need not be applied. At this time, the adder 103 becomes unnecessary and the voltage supplied to the A-phase piezoelectric actuator 13 and B-phase piezoelectric actuator 14 of the supersonic motor 10 at this time becomes as shown by the following equation:

$$V_0 = V_r + V_i = (T_R \times K_{TV}) + V_i$$

If the above voltage $V_0$ is supplied to the two ends of the piezoelectric actuators 13 and 14, then a torque proportional to the reference voltage $V_r$ or the modified reference voltage $V_r'$ can be taken out from the output shaft of the supersonic motor 10.

Second Embodiment

Figure 7:
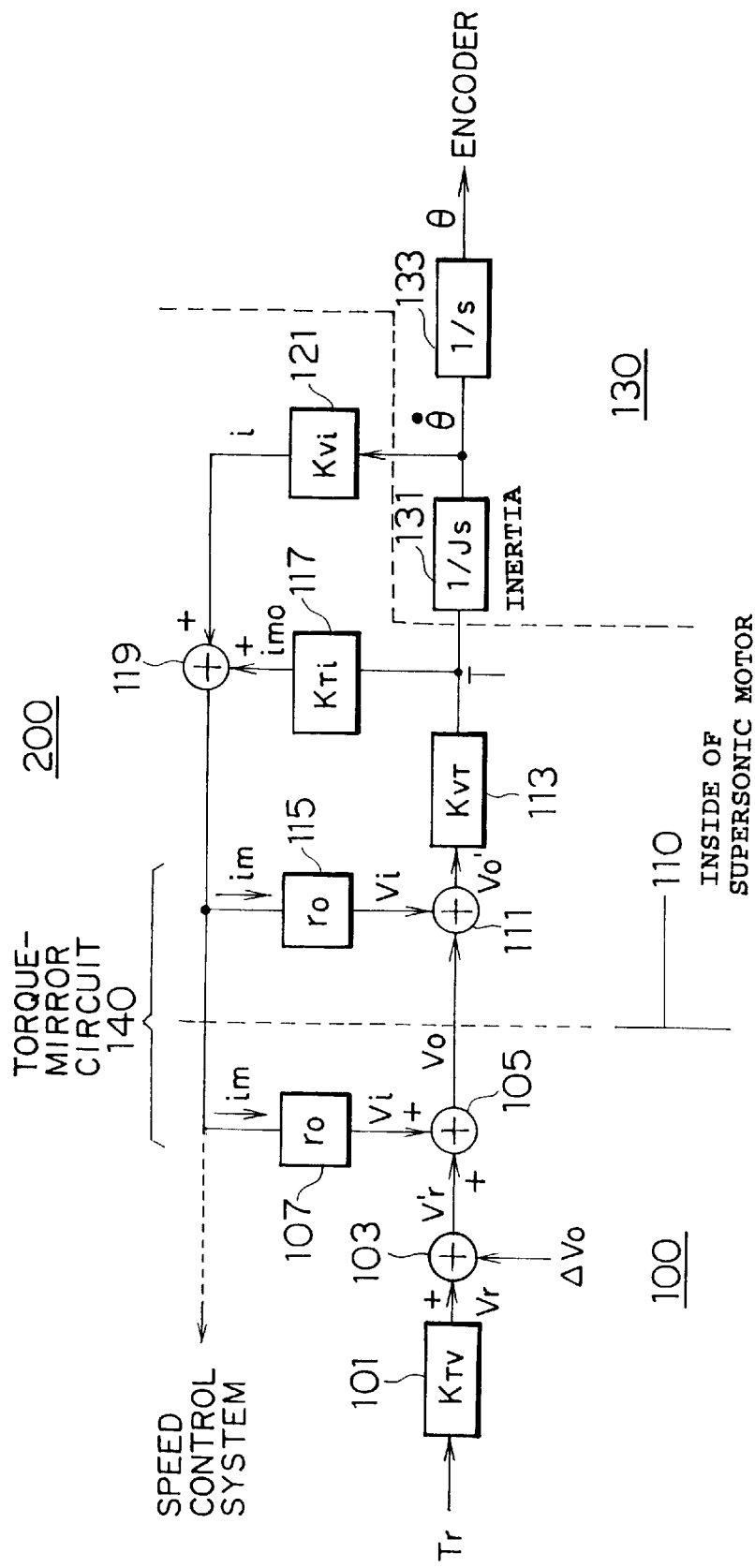
FIG. 7 is a view of an equivalent circuit of a torque control circuit of a supersonic motor using the torque-mirror circuit of the present invention.

FIG. 7 shows an equivalent circuit of the supersonic motor control circuit 200 illustrating the equivalent circuit 110 and mechanical system 130 in the supersonic motor in addition to the configuration of the supersonic motor control circuit 100 of FIG. 6.

The supersonic motor control circuit 200 is comprised of the supersonic motor control circuit 100 shown in FIG. 6, the supersonic motor internal equivalent circuit 110, and the mechanical system 130.

The supersonic motor control circuit 100, like illustrated in FIG. 6, is comprised of a multiplier (circuit) 101 for converting to a reference voltage $V_r$ according to the torque command $T_R$, a first adder (circuit) 103 for adding to the reference voltage a no-load stopping voltage $\Delta V_0$ as an offset to produce a modified reference voltage $V_r'$, an adder circuit 105) for adding to the modified reference voltage $V_r'$ a supersonic motor internal voltage $V_i = i_m \times r_0$, and a multiplier (circuit) 107 for multiplying the mechanical arm resistance $r_0$ with the current $i_m$ to calculate the supersonic motor internal voltage $V_i = i_m \times r_0$.

The equivalent circuit 110 of the inside of the supersonic motor is comprised of an adder (circuit) 111 for adding to the stopping voltage correcting voltage $V_0$ supplied to the A-phase piezoelectric actuator 13 and B-phase piezoelectric actuator 14 of the supersonic motor, output from the adder (circuit) 105 a supersonic motor internal voltage $V_i$ from the multiplier (circuit) 115, a voltage-torque converter 113 for converting the added voltage $V_0' = V_0 + V_i$ from the adder (circuit) 111 to a torque, a torque-current converter 117 for converting the torque T produced by the voltage-torque converter 114 into a current, an adder (circuit) 119 for calculating the current $i_m$, and a multiplier (circuit) 115 for multiplying the mechanical arm resistance $r_0$ with the mechanical arm current $i_m$ to calculate the supersonic motor internal voltage.

The mechanical system 130 is shown by the inertia equivalent portion 131 having the inertia 1/Js and an integration system 133. The output of the inertia equivalent portion 131 is the speed (dot $\Theta$), while the output of the integration system 133 is the position $\Theta$.

The supersonic motor internal equivalent circuit 110 further has a speed-current converter (circuit) 121 for converting the output of the inertia equivalent portion 131, that is, the speed (dot $\Theta$), into current. The output of the integration system 133 is the position $\Theta$.

In the supersonic motor internal equivalent circuit 110, the vibrator 11 of the supersonic motor shown by the voltage-torque converter 113 vibrates in accordance with the voltage $V_0$ supplied to the A-phase piezoelectric actuator 13 and B-phase piezoelectric actuator 14 shown in FIG. 1(A) and the rotor 12 then rotates (moves). The torque T produced in the voltage-torque converter 113 is converted to the corresponding current at the torque-current converter 117. The speed-current converter (circuit) 121 converts the speed, that is, the output of the inertia equivalent portion 131, to the corresponding current The output of the torque-current converter 117 and the output of the speed-current converter (circuit 121) are added by the adder (circuit) 119 and the result is supplied as the detected current $i_m$ to the multiplier (circuit) 107 and multiplier (circuit) 115.

The load of the motor constantly changes, but in the torque control unit 200, the circuit in the supersonic motor control circuit 100 comprised by the multiplier (circuit) 107 and adder (circuit) 105 and the circuit in the supersonic motor internal equivalent circuit 110 comprised by the multiplier (circuit) 115 and the adder (circuit) 111 are completely symmetrical, so a voltage equal to the modified reference voltage $V_R'$ is supplied to the two ends of the load. This circuit 140 corresponds to a voltage mirror circuit. Since the voltage is equal to the torque, it is called a "torque-mirror circuit".

The supersonic motor control circuit 200 enables the supersonic motor, shown by the voltage-torque converter 113, to operate by the reference voltage $V_R$ modified in accordance with the reference torque $T_R$.

In this way, according to the present invention, it is possible to control the supersonic motor in accordance with the torque.

Third Embodiment

In the above, the explanation was made of torque control as the method of control of a supersonic motor of the present invention, but the present invention may also be used for speed control or position control.

Figure 8:
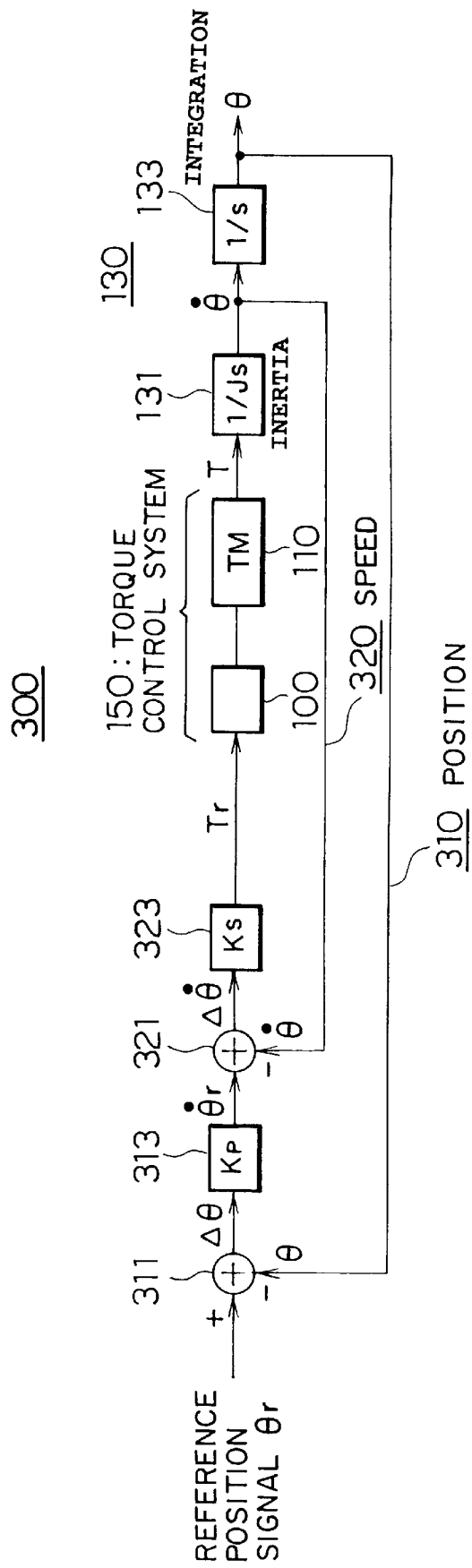
FIG. 8 is a view of an equivalent circuit of the configuration for performing speed control and position control and representing an expansion of the circuit of FIG. 7.

FIG. 8 is a block diagram of a control apparatus 300 for performing torque control, speed control, and position control for a supersonic motor.

In FIG. 8, the control apparatus 300 is provided with a torque control loop 150 including the supersonic motor control circuit 100 shown in FIG. 7 and a torque-mirror circuit 140 shown as the supersonic motor internal equivalent circuit 110 and a speed control loop 320 provided at the outside of the torque control loop 150 and the inertia equivalent portion 131 of the mechanical system 130. Further, a position control loop 310 is provided at the outside of that.

The supersonic motor control circuit 100, not shown, as shown in FIG. 7 includes a multiplier (circuit) 101, an adder (circuit) 103, an adder (circuit) 105, and a multiplier (circuit) 107.

In the same way, the supersonic motor internal equivalent circuit 110, not shown, as shown in FIG. 7, includes an adder (circuit) 111, a voltage-torque converter 113, a multiplier (circuit) 115, a torque-current converter 117, an adder (circuit) 119, and a speed-current converter (circuit) 121.

The mechanical system 130 is comprised of an inertia equivalent portion 131 and an integration system 133.

The position control loop 310 includes an adder (or subtractor) 311 for calculating the deviation (error) $\Delta\Theta$ between the reference position signal $\Theta_R$ and the output position signal $\Theta$ of the integration system 133 and a multiplier (position-speed converter) 313 for converting the position error signal $\Delta\Theta$ to a reference speed signal (dot $\Theta$).

The speed control loop 320 includes an adder (or subtractor) 321 for calculating the error (deviation) between the reference speed signal (dot $\Theta$) from the multiplier (position-speed converter) 313 and the speed signal (dot $\Theta$) from the inertia equivalent portion 131 and a speed-torque conversion circuit (multiplier) 323 for converting the speed error signal calculated at the adder (subtractor) 321 into a reference torque $T_R$.

For the speed signal, use is made of the integral of the mechanical arm current $i_m$ or the output of an encoder (not shown) detecting the rotational position of the supersonic motor 10. The position signal used is either the integral of the mechanical arm current $i_m$ or the output of the encoder.

Next, the operation of the control apparatus 300 shown in FIG. 8 will be explained.

In the control apparatus 300, the torque control loop 150 operates as a minor control loop, the speed control loop 320 at the outside controls the speed, and the position control loop 310 controls the position.

The torque control loop 150 controls the torque of the supersonic motor 10 in accordance with the rotational operation of the torque-mirror circuit 140 when a reference torque $T_R$ is input.

The speed control loop 320 produces a reference torque $T_R$ and controls the speed of the supersonic motor 10 to follow that reference torque $T_R$ so that the actual speed signal (dot $\Theta$) of the inertia equivalent portion 131 matches the reference speed signal (dot $\Theta$) from the multiplier (position-speed converter) 313.

The position control loop 310 controls the position of the supersonic motor 10 so that the actual position signal $\Theta$ of the integration system 133 matches the reference position signal $\Theta_R$.

The block diagram of control of FIG. 8 is equivalent to an ordinary servo loop in an electromagnetic motor etc. Accordingly, it is possible to form a servo loop the same as with an electromagnetic motor for a supersonic motor using the method of control of the present invention.

In particular, the frequency characteristic of the supersonic motor of the present invention extends up to the extremely high region. Accordingly, a supersonic motor using this method of control can be easily incorporated into the position control loop of an FA robot manipulator. In other words, a supersonic motor using the method of control of the present invention can be used in the same way as an electromagnetic motor. In this case, it is possible to take advantage of the torque characteristic, extremely low speed rotation, and other features of a supersonic motor.

In this way, according to the present invention, it becomes possible to form a servo loop for the supersonic motor in the same way as an electromagnetic motor. Accordingly, for example, a supersonic motor may be used for a FA robot.

Note that in the control apparatus 300 shown in FIG. 8, speed control alone is also possible by a configuration not including the position control loop 310. In this case, the adder shown (or subtractor) 311 and multiplier (phase-speed converter) 313 shown in FIG. 8 may be deleted.

The present invention is not limited to the above embodiments.

For example, in the above embodiments, the explanation was made of the method for controlling to zero the phase difference between the voltage supplied to the supersonic motor and the current flowing to the vibrator so as to match the mechanical resonance point of the vibrator of the supersonic motor, but as a modification of this, it is also possible to provide an amplitude sensor for detecting the amplitude of the vibrator of the supersonic motor and control to zero the phase difference between output voltage of the amplitude sensor and the voltage supplied to the piezoelectric actuators.

Note that an amplitude sensor is normally formed inside the piezoelectric actuator. The volate when the charge occurring across the sensor flows through the resistance element is amplified and used as the output voltage.

Further, in the above embodiments, the explanation was made of a progressive wave type supersonic motor as a representative example, but the present invention is not limited to a progressive wave type supersonic motor when worked and may be applied to another type of supersonic motor, for example, a composite supersonic motor.

According to the method of control of a supersonic motor based on the torque-mirror system of the present invention, it is possible to control the torque based on the voltage supplied to the supersonic motor. In other words, it is possible to form a servo loop similar to that for an electromagnetic motor for the supersonic motor.

Further, according to the method of control of a supersonic motor of the present invention, not only is it possible to form a servo loop, but it is also possible to use the characteristics of a supersonic motor, for example, its high torque characteristic, not able to be realized by electromagnetic motors, for various applications.

INDUSTRIAL APPLICABILITY

The supersonic motor of the present invention can be used for various control apparatuses such as control apparatuses incorporating servo loops.

I claim:

1. An apparatus for control of a supersonic motor containing a vibrator, a rotor arranged at a first surface of the vibrator, and at least two piezoelectric actuators provided a predetermined phase apart at a second surface of the vibrator, the apparatus comprising:

means for matching a drive voltage supplied to said piezoelectric actuators with a mechanical resonance point of said vibrator;

a tank circuit, connected to said supersonic motor, including an inductance component, said inductance component having a resonant relationship with an electrostatic capacitance of said vibrator, and a circuit including a mechanical arm resistance circuit of said supersonic motor and a torque-mirror circuit, said circuit supplying a reference voltage, corresponding to a reference torque, to the piezoelectric actuators of said supersonic motor.

2. A method for controlling a supersonic motor comprising:

detecting a varying voltage amplitude corresponding to a varying vibration amplitude of a vibrator of said supersonic motor; and controlling to zero a phase difference between said varying voltage amplitude and a drive voltage supplied to piezoelectic actuators which drive said vibrator.

3. A method of control for a supersonic motor as set forth in claim 2, wherein said drive voltage supplied to the piezoelectric actuators is controlled in accordance with a signal indicating a desired torque of said supersonic motor.

4. A method of controlling a supersonic motor, the method comprising:

matching a drive voltage supplied to piezoelectric actuators of said supersonic motor with a mechanical resonance point of a vibrator in said supersonic motor;

coupling a tank circuit having an inductance component in a resonant relationship with an electrostatic capacitance of said vibrator; and controlling said drive voltage supplied to piezoelectric actuators in accordance with a signal indicating a desired torque of said supersonic motor.

5. A method of control for a supersonic motor having a vibrator and piezoelectric actuators, the method comprising:

supplying a drive voltage, which is derived from a reference voltage corresponding to a reference torque, to the piezoelectric actuators of said supersonic motor by using a circuit comprising a mechanical arm resistance circuit in the supersonic motor and a torque-mirror circuit;

providing a tank circuit having an inductance component in a resonant relationship with an electrostatic capacitance of said vibrator;

controlling the torque of the supersonic motor in accordance with said reference voltage by matching the drive voltage supplied to the piezoelectric actuators in the supersonic motor with a mechanical resonance point of the vibrator of said supersonic motor.

6. A method of control for a supersonic motor as set forth in claim 5, wherein a speed control loop is added at the outside of the torque mirror circuit for speed control of the supersonic motor.

7. A method of control for a supersonic motor as set forth in claim 6, wherein a position control loop is added at the outside of the speed control loop added at the outside of the torque mirror circuit for position control of the supersonic motor.

8. An apparatus for controlling the torque of a supersonic motor, said supersonic motor being comprised of a vibrator, a rotor arranged at a first surface of the vibrator, and at least two piezoelectric actuators provided a predetermined phase apart at a second surface of the vibrator, said apparatus comprising:

a tank circuit coupled with the supersonic motor, said tank circuit including an inductance component having a resonant relationship with an electrostatic capacitance of said supersonic motor;

a torque voltage converting means for converting a reference torque signal to a corresponding reference voltage; and a first circuit comprising a mechanical arm resistance of said supersonic motor and a torque-mirror circuit for generating a control voltage corresponding to said reference voltage from said torque-voltage converting means and directing said control voltage to said two piezoelectric actuators.

9. An apparatus for control of a supersonic motor as set forth in claim 8, wherein said torque-mirror circuit is comprised of a circuit multiplying said mechanical arm resistance and a mechanical arm current of said supersonic motor.

10. An apparatus for control of a supersonic motor as set forth in claim 8 or 9, wherein said supersonic motor is provided, before or after said torque-voltage converting means, with an adding means for adding an offset to said reference voltage.

11. An apparatus for control of a supersonic motor as set forth in claim 8, further comprising:

a means for generating a speed signal indicative of a speed of said supersonic motor, a speed error calculating means for calculating an error between a reference speed signal and said generated speed signal, and a speed-torque converting means for generating said reference torque signal in accordance with said calculated speed error.

12. An apparatus for control of a supersonic motor as set forth in claim 11, wherein said torque-mirror circuit is comprised of a circuit multiplying said mechanical arm resistance and a mechanical arm current of said supersonic motor.

13. An apparatus for control of a supersonic motor supersonic motor as set forth in claim 11, further comprising:

- a means for generating a position signal indicative of a position of the rotor of said supersonic motor,
- a position error calculating means for calculating an error between said generated position signal and a reference position signal, and
- a position-speed converting means for generating a reference speed signal in accordance with said calculated position error.

14. An apparatus for control of a supersonic motor as set forth in claim 13, wherein said torque-mirror circuit is comprised of a circuit multiplying said mechanical arm resistance and a mechanical arm current of said supersonic motor.

15. An apparatus for control of a supersonic motor comprised of a vibrator, a rotor arranged at a first surface of the vibrator, and at least two piezoelectric actuators provided a predetermined phase apart at a second of the vibrator, said apparatus comprising:

- a means for matching a drive voltage supplied to said piezoelectric actuators with a mechanical resonance point of said vibrator,
- a tank circuit, connected to said supersonic motor, having an inductance component, said inductance component having a resonant relationship with an electrostatic capacitance of said vibrator, and
- a means for controlling said drive voltage supplied to said piezoelectric actuators of said supersonic motor in accordance with a signal indicating a desired torque of said supersonic motor.

* * * * *

UNITED STATES PATENT AND TRADEMARK OFFICE
CERTIFICATE OF CORRECTION

PATENT NO. : 5,886,453
DATED : March 23, 1999
INVENTOR(S) : Yasumasa Kyodo

Page 1 of 1

It is certified that error appears in the above-identified patent and that said Letters Patent is hereby corrected as shown below:

Column 15, claim 13,
Line 6, delete "supersonic motor" first occurrence.

Signed and Sealed this

Eighteenth Day of December, 2001

Attest:

Attesting Officer

JAMES E. ROGAN
Director of the United States Patent and Trademark Office